(12) United States Patent
Alastalo et al.

(10) Patent No.: US 10,676,544 B2
(45) Date of Patent: Jun. 9, 2020

(54) PROCESS FOR POLYMERISING ALPHA-OLEFIN MONOMERS

(71) Applicant: Borealis AG, Vienna (AT)

(72) Inventors: Kauno Alastalo, Porvoo (FI); Mohammad Al-Haj Ali, Helsinki (FI); Vasileios Kanellopoulos, Linz (AT); Apostolos Krallis, Espoo (FI)

(73) Assignee: BOREALIS AG, Vienna (AT)

( * ) Notice: Subject to any disclaimer, the term of this patent is extended or adjusted under 35 U.S.C. 154(b) by 126 days.

(21) Appl. No.: 15/773,040

(22) PCT Filed: Nov. 22, 2016

(86) PCT No.: PCT/EP2016/078380
§ 371 (c)(1),
(2) Date: May 2, 2018

(87) PCT Pub. No.: WO2017/097577
PCT Pub. Date: Jun. 15, 2017

(65) Prior Publication Data
US 2018/0327518 A1 Nov. 15, 2018

(30) Foreign Application Priority Data

Dec. 7, 2015 (EP) ..................... 15003479

(51) Int. Cl.
*C08F 2/01* (2006.01)
*C08F 2/14* (2006.01)
(Continued)

(52) U.S. Cl.
CPC ............ *C08F 2/01* (2013.01); *B01J 19/1837* (2013.01); *C08F 2/12* (2013.01); *C08F 2/14* (2013.01); *C08F 10/02* (2013.01); *C08F 10/06* (2013.01)

(58) Field of Classification Search
CPC . C08F 2/01; C08F 2/14; B01J 19/1812; B01J 19/1837
See application file for complete search history.

(56) References Cited

U.S. PATENT DOCUMENTS

2011/0288247 A1   11/2011   Hottovy

FOREIGN PATENT DOCUMENTS

EP        1591459 A1      11/2005
WO     WO 2004/024782 A2    3/2004

OTHER PUBLICATIONS

International Search Report dated Feb. 1, 2017 from PCT/EP2016/078380.

*Primary Examiner* — Caixia Lu
(74) *Attorney, Agent, or Firm* — Fay Sharpe LLP

(57) ABSTRACT

A process for polymerising alpha-olefin monomers in a loop reactor comprising the steps of introducing a main feed stream (2) comprising at least one alpha-olefin monomer into the loop reactor (1); introducing a polymerisation catalyst into the loop reactor (1); polymerising the at least one alpha-olefin monomer in the presence of the polymerisation catalyst in the loop reactor (1) to produce a slurry comprising polyolefin particles; withdrawing an outlet stream (4) comprising at least a portion of the slurry from the loop reactor (1); adding a first feed stream (9) comprising the at least one alpha-olefin monomer and/or hydrogen to the outlet stream (4) to form a concentrator inlet stream (8); introducing the concentrator inlet stream (8) into a concentrator (5); withdrawing from the concentrator (5) an overflow stream (6) comprising the polyolefin particles, wherein the concentration of the polyolefin particles in the overflow stream (6) is smaller than in the concentrator inlet stream (8); withdrawing from the concentrator (5) a bottom outlet stream (12) comprising the polyolefin particles, wherein the concentration of the polyolefin particles in the bottom outlet
(Continued)

stream (12) is greater than in the concentrator inlet stream (8); returning the overflow stream (6) into the loop reactor (1) in an area different from that from which the outlet stream (4) is withdrawn.

20 Claims, 1 Drawing Sheet

(51) Int. Cl.
*B01J 19/18* (2006.01)
*C08F 2/12* (2006.01)
*C08F 10/02* (2006.01)
*C08F 10/06* (2006.01)

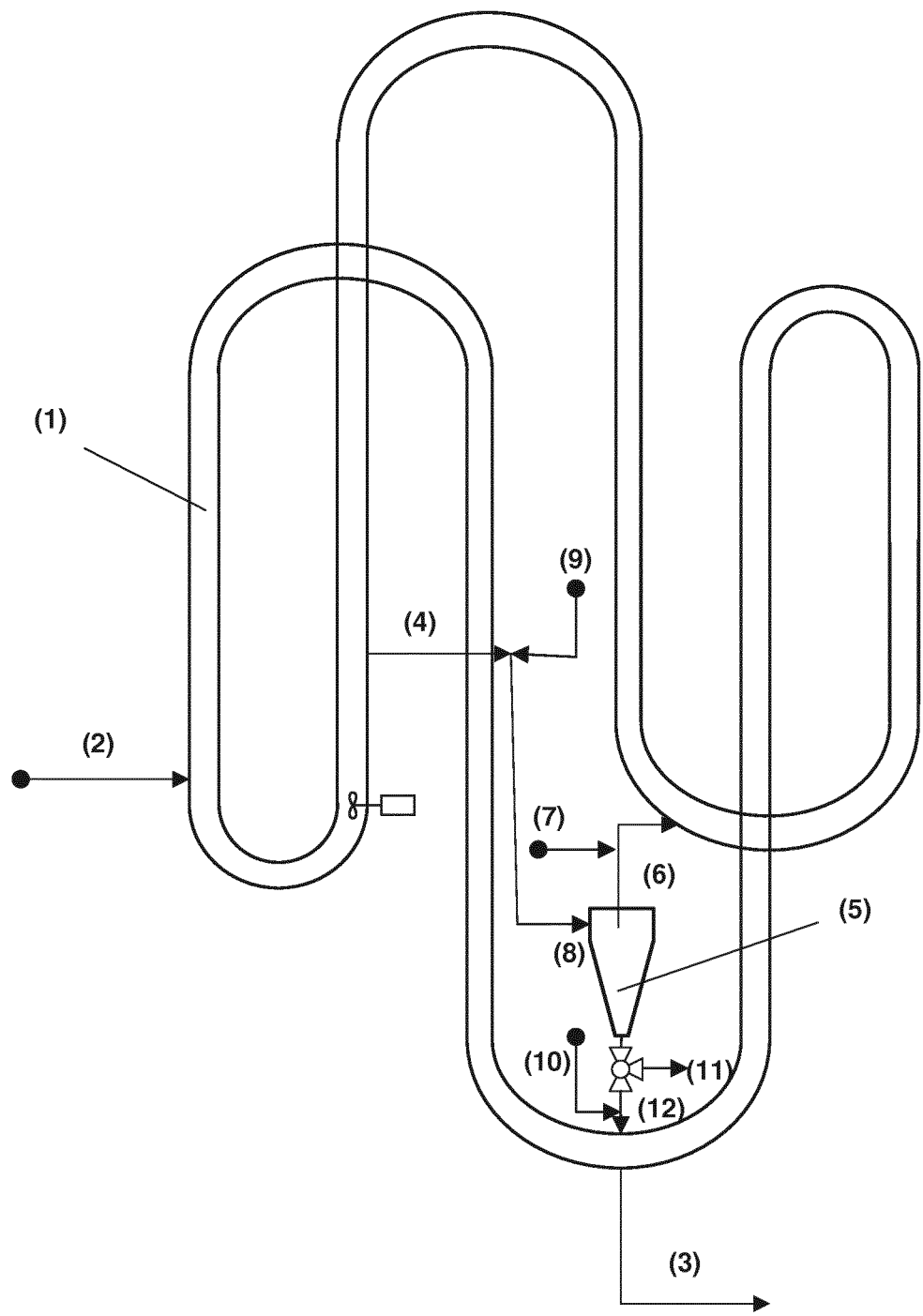

PROCESS FOR POLYMERISING ALPHA-OLEFIN MONOMERS

This is a 371 of PCT Patent Application Serial No. PCT/EP2016/078380 filed Nov. 22, 2016, which claims priority to European Patent Application Serial No. 15003479.1 filed Dec. 7, 2015, the entire contents of which are incorporated herein by reference.

The present invention is directed to a process for polymerizing alpha-olefin monomer(s) in a loop reactor in the presence of an olefin polymerization catalyst. More specifically, the present invention is directed to a process of polymerizing ethylene in hydrocarbon slurry in a loop reactor. In particular, the present invention is directed to a slurry polymerization process where the withdrawn slurry is concentrated by using a concentration device. The present invention is further concerned with a loop reactor suitable for the process for polymerizing alpha-olefin monomers and the use of the loop reactor for the polymerization of alpha-olefin monomer(s).

It is well known that loop reactors are generally of different sizes, i.e. in terms of the length of the reactor and/or in terms of volume. In general, loop reactors are mainly varying in length in order to enhance the production capacity. As a result of this, the cycle time increases with increasing loop reactor length. With increasing cycle time, large concentration gradients for the different reactants, such as monomer(s), comonomer(s) and hydrogen, can be developed along the length of the loop reactor. Such concentration gradients not only affect the quality of the polymer product obtained but also the polymerization growth rate of active catalyst particles inside the loop reactor. The latter can have an adverse effect on process operability and on product properties. Understandably, these effects are more pronounced for large scale loop reactors.

An uneven reactants concentration distribution in loop reactors results in decreased (final) product quality. Additionally, inconsistent growth of polymerizing particles due to reactants concentration gradients along the loop reactor length leads to a broadening of the particle size distribution (PSD) of the produced polyolefin particles, which may result into inhomogeneity at particle level. Therefore, it is important to control and/or maintain the concentration gradients within certain specific ranges, especially for large scale loop reactors.

In existing loop reactors, the concentration of monomer(s) has been maintained within certain limits throughout the loop reaction zone with the use of a single monomer feed in the loop reactor. An improved solution to the aforementioned challenges is the use of a multi-feed concept.

WO 2004/024782 relates to the polymerization of olefin monomers in a liquid medium, particularly in a large loop reactor used for slurry polymerization. A loop reactor apparatus and a process is disclosed where olefin monomers are introduced in multiple feed points along the length of the loop reactor. In particular, the olefin monomer is supplied to the reactor through at least two monomer feeds in such a way that the concentration of the olefin monomer within the loop reaction zone is within a desired range.

U.S. Pat. No. 6,586,537 B2 discloses a process where a hydrocyclone is used for concentrating a slurry stream from a loop reactor. A diluent is introduced to the product withdrawal line upstream of the hydrocyclone. The overhead stream from the hydrocyclone is returned to the loop reactor.

EP 1415999 A2 discloses a process where a hydrocyclone is used to concentrate a slurry stream from a loop reactor. The overhead stream from the hydrocyclone is returned to the loop reactor.

Hence, there is still a need for an improved process for polymerizing alpha-olefin monomer(s) in loop reactors, in particular large scale loop reactors, keeping the hydrogen to monomer(s) molar ratio within acceptable limits over the whole loop reactor length, obtaining uniform particle growth and particle homogeneity and at the same time reaching high efficiency in solid polyolefin particle separation.

It is thus an object of the invention to provide a process for the polymerization of alpha-olefin monomer(s) in a loop reactor, especially loop reactors with a large number of reactor legs, wherein the depletion of monomer(s) and hydrogen is reduced, or even eliminated, avoiding dead reaction zones in the loop reactor and maintaining the hydrogen to monomer(s) molar ratio within acceptable limits over the whole loop reactor length.

It is a further object of the invention to provide a process for the polymerization of alpha-olefin monomer(s) in a loop reactor, especially loop reactors with a large number of reactor legs, allowing the production of polyolefin particles having a narrow particle size distribution and a narrow molecular weight distribution.

It is still a further object of the invention to provide a process for the polymerization of alpha-olefin monomer(s) reducing solid polyolefin particle growth gradients in a loop reactor, especially loop reactors with a large number of reactor legs, increasing the flowability of the produced solid polyolefin particles within the reactor and having a high efficiency in solid polyolefin particle separation.

Insofar, it is an object of the present invention to provide a process for the polymerization of alpha-olefin monomer(s) in which the maximum change of hydrogen to monomer ratio within one loop cycle is reduced, narrowing the particle size distribution (PSD) of the polymer particles obtained and at the same time increasing the concentrator separation efficiency.

It is a further object of the invention to provide a loop reactor suitable for carrying out the process for the polymerization of alpha-olefin monomer(s) as described above.

It has been surprisingly found that all the above objects can be achieved by a process for the polymerization of at least one alpha-olefin monomer in a loop reactor, especially in a loop reactor with a large number of reactor legs, comprising a concentrator, by the step of adding a first feed stream comprising at least one alpha-olefin monomer and/or hydrogen to an outlet stream of the loop reactor to form a concentrator inlet stream which is introduced into the concentrator.

SUMMARY OF THE INVENTION

The present invention provides a process for polymerizing alpha-olefin monomers in a loop reactor comprising the steps of (i) introducing a main feed stream comprising at least one alpha-olefin monomer into the loop reactor;

(ii) introducing a polymerization catalyst into the loop reactor;

(iii) polymerizing the at least one alpha-olefin monomer in the presence of the polymerization catalyst in the loop reactor to produce a slurry comprising polyolefin particles;

(iv) withdrawing an outlet stream comprising at least a portion of the slurry from the loop reactor;

(v) adding a first feed stream comprising the at least one alpha-olefin monomer and/or hydrogen to the outlet stream to form a concentrator inlet stream;

(vi) introducing the concentrator inlet stream into a concentrator;

(vii) withdrawing from the concentrator an overflow stream comprising the polyolefin particles, wherein the concentration of the polyolefin particles in the overflow stream is smaller than in the concentrator inlet stream;

(viii) withdrawing from the concentrator a bottom outlet stream comprising the polyolefin particles, wherein the concentration of the polyolefin particles in the bottom outlet stream is greater than in the concentrator inlet stream;

(ix) returning the overflow stream into the loop reactor in an area different from that from which the outlet stream is withdrawn.

The inventive process has a number of advantages. First, the use of a concentrator, preferably a hydrocyclone, under the above-described configuration improves the stability of the polymerization reactor while reaching high solid polyolefin particle separation efficiency values, enriching the loop reactor outlet stream with solids.

Without wishing to be bound by theory the addition of alpha-olefin monomer and/or hydrogen via the first feed stream to the outlet stream of the loop reactor forming a concentrator inlet stream, which is subsequently introduced into the concentrator, increases the density difference between the liquid and solid phase present within the concentrator and, thus, improving the separation efficiency of the concentrator Second, the uniform reactants' concentrations throughout the whole length of the loop reactor, especially for loop reactors with a large number of reactor legs, e.g. six or more legs, is the key in producing solid polyolefin particles with homogenised molecular properties such as molecular weight distribution, uniform particle growth rate and narrow particle size distribution, enhancing thus the particle homogeneity produced in the loop reactor. In particular, solid polyolefin particles having a narrow particle size distribution (PSD) entering an optional subsequent gas phase reactor (GPR) allow improved gas-solid mixing conditions in said optional gas phase reactor.

With the use of a concentrator, in particular a hydrocyclone, according to the invention the hydrogen to alpha-olefin monomer molar ratio in the loop reactor can be kept within acceptable limits with maximum change within one loop cycle of the loop reactor of equal to or below 25 mol/kmol or preferably even equal to or below 20 mol/kmol.

A further advantage is that the inventive process can be applied or used for various loop reactor lengths, especially loop reactors with a large number of reactor legs, such as four, six or more legs.

The present invention further provides a loop reactor for the process according to any one of the preceding claims, comprising a concentrator, a first conveying pipe connecting a first area of the loop reactor with a middle section of the concentrator, a second conveying pipe connecting an upper section of the concentrator with a second area of the loop reactor, a first feed pipe connected to the first conveying pipe for introducing a first feed stream into the first conveying pipe, and a third conveying pipe connecting a lower section of the concentrator with a third area of the loop reactor.

The present invention also relates to the use of a loop reactor for the polymerization of alpha-olefin monomer(s).

DEFINITIONS

A loop reactor is a closed pipe completely filled with slurry in which the slurry is circulated with a high velocity along the pipe by using a circulation pump. Loop reactors are well known in the art and examples are given, for instance, in U.S. Pat. Nos. 4,582,816, 3,405,109, 3,324,093, EP-A-479186 and U.S. Pat. No. 5,391,654.

Alpha-olefins are alkenes having a double bond at the primary or alpha (α) position. For the sake of the present invention alkenes with one or more additional double bond(s) such as dienes also fall under the definition of alpha-olefins as long as a double bond in alpha position is present.

A concentrator is a device to concentrate particles in a liquid suspension or slurry resulting in two streams, a first or bottom outlet stream, usually the stream withdrawn from the lower section of the device, with a higher concentration of particles and a second or overflow stream, usually the stream withdrawn from the upper section of the device, with a lower concentration of particles.

A hydrocyclone is a device to classify, separate or sort particles in a liquid suspension or slurry based on the ratio of their centripetal force to fluid resistance. This ratio is high for dense (where separation by density is required) and coarse (where separation by size is required) particles, and low for light and fine particles. Hydrocyclones also find application in the separation of liquids of different densities. A hydrocyclone will normally have a cylindrical section at the top where liquid suspension or slurry is being fed tangentially, and a conical base. The angle, and hence length of the conical section, plays a role in determining operating characteristics, Hydrocyclones are for instance described in "Svarovsky L. and Thew M. T., Hydrocyclones Analysis and Applications, Springer Science and Business Media B. U., 1992".

A slurry or suspension is a heterogeneous mixture of solid particles dispersed in a liquid phase. The solid particles are usually solid polymer particles obtained by the polymerization process. The fluid phase usually comprises unreacted alpha-olefin monomer(s), and optionally a diluent.

DETAILED DESCRIPTION

General Description

The present invention is directed to a process for producing a polyolefin in a loop reactor by polymerizing at least one alpha-olefin monomer in the presence of a polymerization catalyst, preferably in the presence of a pre-polymerized catalyst.

The polyolefin produced in the loop reactor can be an olefin homo- or copolymer.

The at least one alpha-olefin monomer is preferably selected from ethylene, propylene, 1-butene, 1-pentene, 1-hexene, 4-methyl-1-pentene, 1-heptene, 1-octene, 1-decene, styrene, vinyl norbornene, vinylcyclohexane, butadiene, 1,4-hexadiene, 4-methyl-1,7-octadiene, 1,9-decadiene and their mixtures, more preferably selected from ethylene, propylene and their mixture. Especially, the process is useful in polymerizing ethylene or propylene and their mixtures, optionally together with further alpha-olefin monomer(s) having from 4 to 12 carbon atoms as described above. Especially preferred propylene and/or ethylene homo- or copolymers are produced in the process according to the invention. Mostly preferred, propylene and/or ethylene homopolymers are produced in the process according to the invention.

The polyolefin produced in the loop reactor can have a broad range of melt flow rates. Usually, the polyolefin produced in the loop reactor has a melt flow rate $MFR_2$ (190° C., 2.16 kg) of from 0.1 to 1000 g/10 min.

Furthermore, with the process according to the invention polyolefins within a broad density range can be produced. The polyolefin produced in the loop reactor usually has a density in the range of from 860 to 980 kg/m$^3$, more preferably of from 870 to 975 kg/m$^3$.

In addition to the alpha-olefin monomers different co-reactants, adjuvants, activators, catalysts, co-catalysts and/or inert components may be introduced into the loop reactor, preferably via the main feed stream.

In a preferred embodiment, the process according to the invention is a multi-stage polymerization process, i.e. the polyolefin is polymerized in a reactor cascade which comprises at least one additional reactor upstream and/or downstream of the loop reactor connected in series. Usually, this at least one additional reactor is selected from slurry reactor(s) and gas phase reactor(s).

Preferably, the reactor cascade comprises at least one, more preferably one or two gas phase reactor(s) upstream or downstream, preferably downstream of the loop reactor.

Optionally, the reactor cascade comprises one or two additional slurry reactor(s), preferably loop reactor(s) upstream and/or downstream of the loop reactor. These additional loop reactor(s) can have the same configuration as the loop reactor described in the present invention.

In a preferred embodiment, the reactor cascade comprises the loop reactor as described in the present invention followed by a gas phase reactor downstream of said loop reactor. Optionally, a slurry reactor is situated upstream of said loop reactor. Said optional slurry reactor preferably is a loop reactor. Further, said optional slurry reactor preferably has a lower volume as the loop reactor described in the present invention.

Catalyst

The polymerization is conducted in the presence of a polymerization catalyst. The polymerization catalyst may be any catalyst which is capable of producing the desired alpha-olefin homopolymer or copolymer, in particular polyethylene homo- or copolymers and polypropylene homo- or copolymers. Preferably, the polymerization catalyst is a Ziegler-Natta catalyst or a metallocene catalyst.

Suitable catalysts are, among others, Ziegler-Natta catalysts based on a transition metal, such as titanium, zirconium and/or vanadium catalysts.

Especially Ziegler-Natta catalysts are useful as they can produce polyolefins within a wide range of molecular weight with a high productivity.

Suitable Ziegler-Natta catalysts preferably contain a magnesium compound, an aluminium compound and a titanium compound supported on a particulate support.

The particulate support can be an inorganic oxide support, such as silica, alumina, titania, silica-alumina and silica-titania. Preferably, the support is silica.

The average particle size of the silica support can be typically from 2 to 80 µm. However, it has turned out that special advantages can be obtained if the support has an average particle size from 3 to 60 µm, preferably from 6 to 50 µm.

The magnesium compound is a reaction product of a magnesium dialkyl and an alcohol. The alcohol is a linear or branched aliphatic monoalcohol. Preferably, the alcohol has from 6 to 16 carbon atoms. Branched alcohols are especially preferred, and 2-ethyl-1-hexanol is one example of the preferred alcohols. The magnesium dialkyl may be any compound of magnesium bonding to two alkyl groups, which may be the same or different. Butyl-octyl magnesium is one example of the preferred magnesium dialkyls.

The aluminium compound is chlorine containing aluminium alkyl. Especially preferred compounds are aluminium alkyl dichlorides and aluminium alkyl sesquichlorides.

The titanium compound is a halogen containing titanium compound, preferably chlorine containing titanium compound. Especially preferred titanium compound is titanium tetrachloride.

The catalyst can be prepared by sequentially contacting the carrier with the above mentioned compounds, as described in EP-A-688794 or WO-A-99/51646.

Alternatively, it can be prepared by first preparing a solution from the components and then contacting the solution with a carrier, as described in WO-A-01/55230.

Another group of suitable Ziegler-Natta catalysts contain a titanium compound together with a magnesium halide compound acting as a support. Thus, the catalyst contains a titanium compound on a magnesium dihalide, like magnesium dichloride. Such catalysts are disclosed, for instance, in WO-A-2005/118655 and EP-A-810235.

Still a further type of Ziegler-Natta catalysts are catalysts prepared by a method, wherein an emulsion is formed, wherein the active components form a dispersed, i.e. a discontinuous phase in the emulsion of at least two liquid phases. The dispersed phase, in the form of droplets, is solidified from the emulsion, wherein catalyst in the form of solid particles is formed. The principles of preparation of these types of catalysts are given in WO-A-2003/106510.

The Ziegler-Natta catalyst is used together with an activator. Suitable activators are metal alkyl compounds and especially aluminium alkyl compounds. These compounds include alkyl aluminium halides, such as ethylaluminium dichloride, diethylaluminium chloride, ethylaluminium sesquichloride, dimethylaluminium chloride and the like. They also include trialkylaluminium compounds, such as trimethylaluminium, triethylaluminium, tri-isobutylaluminium, tri-hexylaluminium and tri-n-octylaluminium. Furthermore they include alkylaluminium oxy-compounds, such as methylaluminiumoxane (MAO), hexaisobutylaluminiumoxane (HIBAO) and tetraisobutylaluminiumoxane (TIBAO). Also other aluminium alkyl compounds, such as isoprenylaluminium, may be used. Especially preferred activators are trialkylaluminiums, of which triethylaluminium, trimethylaluminium and tri-isobutylaluminium are particularly used.

The amount in which the activator is used depends on the specific catalyst and activator. Typically triethylaluminium is used in such amount that the molar ratio of aluminium to the transition metal, like Al/Ti, is from 1 to 1000, preferably from 3 to 100 and in particular from about 5 to about 30 mol/mol.

A Ziegler-Natta type catalyst typically used in the present invention for propylene polymerization is a stereospecific, solid high yield Ziegler-Natta catalyst component comprising as essential components Mg, Ti and Cl. In addition to the solid catalyst a cocatalyst(s) as well external donor(s) are typically used in the polymerization process.

The components of the catalyst may be supported on a particulate support, such as inorganic oxide, like silica or alumina, or, usually, the magnesium halide may form the solid support. It is also possible that catalysts components are not supported on an external support, but catalyst is prepared by emulsion-solidification method or by precipitation method.

The solid catalyst usually also comprises an electron donor (internal electron donor) and optionally aluminium. Suitable internal electron donors are, among others, esters of carboxylic acids or dicarboxylic acids, like phthalates, maleates, benzoates, citraconates, and succinates, 1,3-diethers or oxygen or nitrogen containing silicon compounds. In addition mixtures The cocatalyst typically comprises an aluminium alkyl compound. The aluminium alkyl compound of donors can be used. The cocatalyst is preferably trialkyl aluminium such as trimethylaluminium, triethylaluminium, tri-isobutylaluminium or tri-n-octylaluminium. However, it may also be an alkylaluminium halide, such as diethylaluminium chloride, dimethylaluminium chloride and ethylaluminium sesquichloride.

Suitable external electron donors used in polymerization are well known in the art and include ethers, ketones, amines, alcohols, phenols, phosphines and silanes.

Silane type exernal donors are typically organosilane compounds containing Si—OCOR, Si—OR, or Si—NR$_2$ bonds, having silicon as the central atom, and R is an alkyl, alkenyl, aryl, arylalkyl or cycloalkyl with 1-20 carbon atoms are known in the art.

Examples of suitable catalysts and compounds in catalysts are shown in among others, in WO 87/07620, WO 92/21705, WO 93/11165, WO 93/11166, WO 93/19100, WO 97/36939, WO 98/12234, WO 99/33842, WO 03/000756, WO 03/000757, WO 03/000754, WO 03/000755, WO 2004/029112, EP 2610271, WO 2012/007430. WO 92/19659, WO 92/19653, WO 92/19658, U.S. Pat. Nos. 4,382,019, 4,435,550, 4,465,782, 4,473,660, 4,560,671, 5,539,067, 5,618,771, EP45975, EP45976, EP45977, WO 95/32994, U.S. Pat. Nos. 4,107,414, 4,186,107, 4,226,963, 4,347,160, 4,472,524, 4,522,930, 4,530,912, 4,532,313, 4,657,882, 4,581,342, 4,657,882.

Also metallocene catalysts may be used in the process of the present invention. Metallocene catalysts comprise a transition metal compound which contains a cyclopentadienyl, indenyl or fluorenyl ligand. Preferably the catalyst contains two cyclopentadienyl, indenyl or fluorenyl ligands, which may be bridged by a group preferably containing silicon and/or carbon atom(s). Further, the ligands may have substituents, such as alkyl groups, aryl groups, arylalkyl groups, alkylaryl groups, silyl groups, siloxy groups, alkoxy groups or other heteroatom groups or the like.

Suitable metallocene catalysts are known in the art and are disclosed, among others, in EP-A-629631, EP-A-629632, WO-A-00/26266, WO-A-02/002576, WO-A-02/002575, WO-A-99/12943, WO-A-98/40331, EP-A-776913, EP-A-1074557 and WO-A-99/42497, WO-A-95/12622, WO-A-96/32423, WO-A-97/28170, WO-A-98/32776, WO-A-99/61489, WO-A-03/010208, WO-A-03/051934, WO-A-03/051514, WO-A-2004/085499, EP-A-1752462 and EP-A-1739103.

The metallocene catalyst is used together with an activator. Suitable activators are metal alkyl compounds and especially aluminium alkyl compounds known in the art. Especially suitable activators used with metallocene catalysts are alkylaluminium oxy-compounds, such as methylalumoxane (MAO), tetraisobutylalumoxane (TIBAO) or hexaisobutylalumoxane (HIBAO), In the concentrator, the outlet stream comprising at least a portion of the slurry withdrawn from the loop reactor is concentrated.

Polymerization Process in the Loop Reactor

The process according to the invention is conducted in a loop reactor.

In the loop reactor a polyolefin is produced. This is done by introducing a polymerization catalyst, optionally through a polymerization step or a prepolymerization step as described below, via an inlet of the main feed stream into the loop reactor together with the at least one alpha-olefin monomer and optionally one or more other alpha-olefin monomer(s), hydrogen and a diluent.

The alpha-olefin monomer, and optionally one or more further alpha-olefin monomer(s), is introduced into the loop reactor via the main feed stream. The main feed stream usually also comprises hydrogen and optionally a diluent as described below.

Preferably, the polymerization catalyst is introduced into the loop reactor via the main feed stream.

The present polymerization stage is conducted as a particle form process. In such a process the polymerization catalyst is introduced into the loop reactor in particle form, preferably through the prepolymerization step as described below. The polyolefin then grows on the catalyst particles thereby forming a slurry comprising polyolefin particles.

The polymerization in the loop reactor is conducted as a slurry polymerization. The slurry polymerization usually takes place in a diluent, preferably an inert diluent. The diluent is typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons. An especially preferred diluent is propane, possibly containing minor amount of methane, ethane and/or butane.

The alpha-olefin monomer content in the liquid phase of the slurry may be from 1 to 50 mol %, preferably from 2 to 20 mol % and in particular from 2 to 10 mol %. The benefit of having a high alpha-olefin monomer concentration is that the productivity of the catalyst is increased but the drawback is that more alpha-olefin monomer then needs to be recycled than if the concentration was lower.

The temperature in the loop reactor is typically from 60 to 100° C., preferably from 70 to 90° C. An excessively high temperature should be avoided to prevent partial dissolution of the polyolefin into the diluent and the fouling of the reactor. The pressure is from 1 to 150 bar, preferably from 40 to 80 bar.

The slurry may be withdrawn from the loop reactor either continuously or intermittently. A preferred way of intermittent withdrawal is the use of settling legs where slurry is allowed to concentrate before withdrawing a batch of the concentrated slurry from the reactor. The use of settling legs is disclosed, among others, in U.S. Pat. Nos. 3,374,211, 3,242,150 and EP-A-1310295. Continuous withdrawal is disclosed, among others, in EP-A-891990, EP-A-1415999, EP-A-1591460 and WO-A-2007/025640. The continuous withdrawal is advantageously combined with a suitable concentration method, as disclosed in EP-A-1310295 and EP-A-1591460. It is preferred to withdraw the slurry from the loop reactor continuously.

Hydrogen is preferably introduced into the loop reactor for controlling the melt flow rate (MFR) of the polyolefin. The amount of hydrogen needed to reach the desired MFR depends on the catalyst used and the polymerization conditions. The desired polyolefin properties have been obtained in slurry polymerization in a loop reactor with the molar ratio of hydrogen to alpha-olefin monomer preferably of from 0 to 10000 mol/kmol (or mol/1000 mol), more preferably of from 0.1 to 8000 mol/kmol, The alpha-olefin monomer flow rate in the main feed stream is preferably 100 to 100000 kg/h, more preferably 1000 to 80000 kg/h, more preferably 5000 to 60000 kg/h, and most preferably 10000 to 50000 kg/h. The flow rate of each further alpha-olefin monomer, if present, in the main feed stream is within the preferred ranges described above.

The molar ratio of hydrogen to alpha-olefin monomer in the main feed stream is preferably 0 to 10000 mol/kmol (or mol/1000 mol), more preferably of from 0.1 to 8000 mol/kmol, more preferably of from 1 to 6000 mol/kmol, and even more preferably from 100 to 5000 mol/kmol. The molar ratio of hydrogen to each further alpha-olefin monomer, if present, in the main feed stream is within the preferred ranges described above.

The average residence time in the loop reactor is typically from 20 to 120 minutes, preferably from 30 to 80 minutes. As it is well known in the art the average residence time T can be calculated from:

$$\tau = \frac{V_R}{Q_o} \qquad \text{(eq. 1)}$$

where $V_R$ is the volume of the reaction space (i.e. the volume of the reactor) and $Q_o$ is the volumetric flow rate of the product stream (including the polyolefin product and the fluid reaction mixture).

The production rate in the loop reactor is suitably controlled with the catalyst feed rate. It is also possible to influence the production rate by suitable selection of the alpha-olefin monomer concentration in the loop reactor. The desired alpha-olefin monomer concentration can then be achieved by suitably adjusting the alpha-olefin monomer feed rate into the loop reactor.

The loop reactor used in the process according to the present invention differs from a conventional loop reactor as e.g. described in U.S. Pat. Nos. 4,582,816, 3,405,109, 3,405,109, 3,324,093, EP-A-479186 and U.S. Pat. No. 5,391,654 by additionally comprising a concentrator. Said concentrator preferably is a hydrocyclone.

The concentrator is connected to the loop reactor by at least two, preferably three conveying pipes which are preferably connected to different areas of the loop reactor.

A first conveying pipe connects the loop reactor with a middle section of the concentrator and is used to withdraw the outlet stream from the loop reactor and to introduce the concentrator inlet stream into the concentrator.

A second conveying pipe connects the upper section of the concentrator with a different area of the loop reactor and is used to withdraw the overflow stream from the concentrator and to introduce said overflow stream into the loop reactor.

Optionally, a third conveying pipe connects the lower section of the concentrator with a different area of the loop reactor and is used to withdraw the bottom outlet stream from the concentrator and to introduce said bottom outlet stream into the loop reactor.

The first feed stream comprising the at least one alpha-olefin monomer and/or hydrogen is added to the outlet stream, thereby forming a concentrator inlet stream which enters the concentrator. The alpha-olefin monomer flow rate in the first feed stream is preferably 100 to 100000 kg/h, more preferably 1000 to 80000 kg/h, more preferably 5000 to 60000 kg/h, and most preferably 10000 to 50000 kg/h. The flow rate of each further alpha-olefin monomer, if present, in the first feed stream is within the preferred ranges described above.

The first feed stream is preferably introduced via the first feed pipe into the first conveying pipe.

The molar ratio of hydrogen to alpha-olefin monomer in the first feed stream is preferably 0 to 10000 mol/kmol (or mol/1000 mol), more preferably of from 0.1 to 8000 mol/kmol, more preferably of from 1 to 6000 mol/kmol, and even more preferably from 100 to 5000 mol/kmol. The molar ratio of hydrogen to each further alpha-olefin monomer, if present, in the first feed stream is within the preferred ranges described above.

Preferably, the first feed stream has the same composition as the main feed stream.

Preferably, the bottom outlet stream is returned into the loop reactor in an area different from that from which the outlet stream is withdrawn or passed to a subsequent loop reactor or passed to a subsequent gas phase reactor. More preferably, the bottom outlet stream is returned into the loop reactor as described above.

The process preferably further comprises adding a second feed stream comprising the at least one alpha-olefin monomer and/or hydrogen to the overflow stream before returning the combined second feed stream/overflow stream into the loop reactor.

The alpha-olefin monomer flow rate in the second feed stream is preferably 100 to 100000 kg/h, more preferably 1000 to 80000 kg/h, more preferably 5000 to 60000 kg/h, and most preferably 10000 to 50000 kg/h. The flow rate of each further alpha-olefin monomer, if present, in the second feed stream is within the preferred ranges described above.

The molar ratio of hydrogen to alpha-olefin monomer in the second feed stream is preferably 0 to 10000 mol/kmol (or mol/1000 mol), more preferably of from 0.1 to 8000 mol/kmol, more preferably of from 1 to 6000 mol/kmol, and even more preferably from 100 to 5000 mol/kmol. The molar ratio of hydrogen to each further alpha-olefin monomer, if present, in the second feed stream is within the preferred ranges described above.

Preferably, the second feed stream has the same composition as the main feed stream.

The process preferably further comprises adding a third feed stream comprising the at least one alpha-olefin monomer and/or hydrogen to the bottom outlet stream before returning the combined third feed stream/bottom outlet stream into the loop reactor. The addition of alpha-olefin monomer and/or hydrogen via the third feed stream has the advantage of avoiding plugging of the bottom outlet stream pipe and allows controlling the concentration of the solid polyolefin particles in the combined third feed stream/bottom outlet stream being returned back into the loop reactor.

The alpha-olefin monomer flow rate in the third feed stream is preferably 100 to 100000 kg/h, more preferably 1000 to 80000 kg/h, more preferably 5000 to 60000 kg/h, and most preferably 10000 to 50000 kg/h. The flow rate of each further alpha-olefin monomer, if present, in the third feed stream is within the preferred ranges described above.

The molar ratio of hydrogen to alpha-olefin monomer in the third feed stream is preferably 0 to 10000 mol/kmol (or mol/1000 mol), more preferably of from 0.1 to 8000 mol/kmol, more preferably of from 1 to 6000 mol/kmol, and even more preferably from 100 to 5000 mol/kmol. The molar ratio of hydrogen to each further alpha-olefin monomer, if present, in the third feed stream is within the preferred ranges described above.

Preferably, the third feed stream has the same composition as the main feed stream.

In a preferred embodiment, the first feed stream, the second feed steam and the third feed stream have the same composition as the main feed stream.

The process preferably further comprises the step of withdrawing a slurry stream from the loop reactor. The slurry stream comprises solid polyolefin particles produced in the loop reactor by polymerizing the at least one alpha-olefin monomer in the presence of the polymerization catalyst. The mass fraction of solid polyolefin particles in the slurry stream is preferably 20 to 65 wt %, more preferably 30 to 60 wt %, and most preferably 40 to 55 wt %.

The slurry stream is withdrawn from the loop reactor with a flow rate of preferably 100 to 100000 kg/h, more preferably 1000 to 80000 kg/h, more preferably 5000 to 60000 kg/h, and most preferably 10000 to 50000 kg/h.

Preferably, a product withdrawal stream is split off from the bottom outlet stream.

The slurry stream is preferably combined with the product withdrawal stream, forming a combined slurry/product withdrawal stream.

The overflow stream, preferably combined with the second feed stream, enters the loop reactor at a distance of preferably 30 to 60%, more preferably 40 to 55%, and most preferably 45 to 55% of the total loop reactor length downstream of the inlet of the main feed stream.

The bottom outlet stream is withdrawn from the bottom of the concentrator at a rate of preferably 100 to 100000 kg/h, more preferably 1000 to 80000 kg/h, more preferably 5000 to 60000 kg/h, and most preferably 10000 to 50000 kg/h.

The mass fraction of solid polyolefin particles in the bottom outlet stream is preferably 20 to 65 wt %, more preferably 30 to 60 wt %, and most preferably 40 to 55 wt %.

When the bottom outlet stream is reintroduced into the loop reactor, the bottom outlet stream, preferably combined with the third feed stream, enters the loop reactor at a distance of preferably 65 to 90%, more preferably 67 to 85%, and most preferably 70 to 80% of the total loop reactor length downstream of the inlet of the main feed stream.

Prepolymerization Step

Optionally, a prepolymerization step precedes process step (i) of the process according to the present invention. The purpose of the prepolymerization is to polymerize a small amount of polyolefin onto the catalyst at a low temperature and/or a low alpha-olefin monomer concentration. By prepolymerization it is possible to improve the performance of the catalyst in slurry and/or modify the properties of the final polyolefin. The prepolymerization step is preferably conducted in a slurry reactor.

Thus, the prepolymerization step may be conducted in a loop reactor. The prepolymerization is then preferably conducted in a diluent, preferably an inert diluent. The diluent is typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons.

The temperature in the prepolymerization step is typically from 0 to 90° C., preferably from 20 to 70° C. and more preferably from 30 to 60° C.

The pressure is not critical and is typically from 1 to 150 bar, preferably from 10 to 100 bar.

The amount of alpha-olefin monomer is typically such that from about 0.1 to 1000 grams of alpha-olefin monomer per one gram of solid catalyst component is polymerized in the prepolymerization step. As the person skilled in the art knows, the catalyst particles recovered from a continuous prepolymerization reactor do not all contain the same amount of prepolymer. Instead, each particle has its own characteristic amount which depends on the residence time of that particle in the prepolymerization reactor. As some particles remain in the reactor for a relatively long time and some for a relatively short time, then also the amount of prepolymer on different particles is different and some individual particles may contain an amount of prepolymer which is outside the above limits. However, the average amount of prepolymer on the catalyst typically is within the limits specified above.

The molecular weight of the prepolymer may be controlled by hydrogen as it is known in the art. Further, antistatic additive may be used to prevent the particles from adhering to each other or the walls of the reactor, as disclosed in WO-A-96/19503 and WO-A-96/32420.

The catalyst components are preferably all introduced to the prepolymerization step when a prepolymerization step is present. However, where the solid catalyst component and the cocatalyst can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

Further Polymerization Stages

The subsequent polymerization reactors, if present, may be further slurry polymerization reactors or they may also be gas phase polymerization reactors. Examples of such gas phase polymerization reactors are a fluidized bed polymerization reactor, a fast fluidized bed reactor, a settled bed reactor and combinations of these. Subsequent polymerization reactors may be any reactors known to the person skilled in the art.

Loop Reactor

The present invention is further concerned with a loop reactor suitable for carrying out the process for polymerizing alpha-olefin monomers described herein. The loop reactor comprises a concentrator, a first conveying pipe connecting a first area of the loop reactor with a middle section of the concentrator, a second conveying pipe connecting an upper section of the concentrator with a second area of the loop reactor, a first feed pipe connected to the first conveying pipe for introducing a first feed stream into the first conveying pipe, and a third conveying pipe connecting a lower section of the concentrator with a third area of the loop reactor.

The first conveying pipe connects a first area of the loop reactor with the middle section of the concentrator and is used to withdraw the outlet stream from the loop reactor and to introduce the concentrator inlet stream into the concentrator.

The second conveying pipe connects the upper section of the concentrator with a second area of the loop reactor and is used to withdraw the overflow stream from the concentrator and to introduce said overflow stream into the loop reactor.

The first feed pipe connects a source for the first feed stream with the first conveying pipe and is used to introduce the first feed stream into the first conveying pipe. Preferably, the source for the first feed stream is also the source for the main feed stream and/or the source for the second feed stream and/or the source for the third feed stream. More preferably, the source for the first feed stream is also the source for the main feed stream.

The third conveying pipe connects the lower section of the concentrator with a third area of the loop reactor and is used to withdraw the bottom outlet stream from the concentrator and to introduce said bottom outlet stream into the loop reactor.

The loop reactor preferably comprises an inlet for introducing the main feed stream into the loop reactor.

Preferably, the first, the second and the third area of the loop reactor are all different areas of the loop reactor.

The first area of the loop reactor is preferably the outlet for withdrawing the outlet stream.

The second area of the loop reactor is preferably the area at a distance of 30 to 60%, preferably 40 to 55%, and more preferably 45 to 55% of the total loop reactor length downstream of the inlet of the main feed stream.

The third area of the loop reactor is preferably the area at a distance of 65 to 90%, preferably 67 to 85%, and more preferably 70 to 80% of the total loop reactor length downstream of the inlet of the main feed stream.

The present invention is also concerned with the use of loop reactor comprising a concentrator according to the invention for the polymerization of alpha-olefin monomer(s).

Description of methods a) Melt Flow Rate

The melt flow rate (MFR) is determined according to ISO 1133 and is indicated in g/10 min. The MFR is an indication of the flowability, and hence the processability, of the polyolefin. The higher the melt flow rate, the lower the viscosity of the polyolefin. The $MFR_2$ of the polyolefin is measured at a temperature of 190° C. and a load of 2.16 kg.

b) Density

The density of the polyolefin was measured according to ISO 1183-1:2004 Method A on compression moulded specimen prepared according to EN ISO 1872-2 (February 2007) and is given in kg/m$^3$.

The density of the slurry was measured by radioactive measurements known in the art. Suitable apparatuses for radioactive measurements are provided by Berthold Technologies GmbH, Vega Americas, Inc., Omega Engineering, Inc. and RGI GmbH.

c) Measurement of solids concentration

The slurry density is measured by radioactive measurements as described above, and the solids concentration is given by the following formula (1):

$$s_f = \left(\frac{p_r - p_l}{p_p - p_r}\right)\frac{p_p}{p_r} \quad (1)$$

$s_f$: solids weight fraction in loop reactor
$p_r$: slurry density (kg/m$^3$)
$p_l$: liquid phase density (kg/m$^3$)
$p_p$: polymer density (kg/m$^3$)

d) Mass flow rate

The mass flow rates can be determined by any method known in the art, such as methods based on Coriolis force, methods based on thermal conductivity, methods based on pressure difference and others.

Suitable mass flowmeters for the measurement of the mass flow rate of solids flows are LB442 distributed by Berthold Technologies (radioactive) and Multicor distributed by Schenck AccuRate (Coriolis force).

A suitable mass flowmeter for the measurement of the flow rate is Micro Motion (e.g. Elite Coriolis meter) distributed by Emerson Process Management.

e) Separation efficiency

The separation efficiency "Eff" of the concentrator is defined according the following formula (2) below:

$$Eff = \frac{ms_u}{ms_f} \quad (2)$$

where
$ms_u$: Solids flowrate in the concentrator bottom outlet stream (kg/h)
$ms_f$: Solids flowrate in the concentrator inlet stream (kg/h)

The solids flowrate is determined as follows: The stream flowrates are measured by mass flowmeters while the solids content of the streams is determined by the procedure described under item "c) Measurement of solid concentration" above.

REFERENCES

1. Plitt L. R., A mathematical model of the hydrocyclone classifier, CIM Bull., Vol 69, No 776, 114-123 (1976).
2. Flinthoff B. C., Plitt L. R. & Turak A. A., Cyclone modelling: a review of present technology, CIM Bull., Vol 80, No 905, 39-50 (1987).
3. R. A. Arterburn, The Sizing and Selection of Hydrocyclones, Metallurgical Handbook.
4. Hinde, A. L., 1977. Control of milling circuits using simple feed back loops, Grinding Theory and Practice. SAIMM Vacation School, Johannesburg. pp. 192-214.
5. King, R. P, 2001. Modelling and Simulation of Mineral Processing Systems. Butterworth-Heinemann, Oxford.

f) Maximum change within one loop cycle

Two samples of equal volume from the loop reactor slurry are taken from two different points upstream and downstream of the inlet of the main feed stream, respectively. The samples are flushed under atmospheric pressure and the produced gas streams of the samples are directed to a properly calibrated GC (gas chromatograph) analyser. The compositions and the concentrations of hydrogen and alpha-olefin monomer of the two samples are determined. From the concentration differences of hydrogen and alpha-olefin monomer in these two samples the maximum change of hydrogen to alpha-olefin monomer, e.g. ethylene or propylene, molar ratio in one loop cycle of the loop reactor is calculated.

g) Particle size distribution (PSD)

Particle size distribution was measured in accordance with ISO 13320-1 with a Coulter LS 200 instrument. The instrument is able to measure the PSD in a range of 0.4-2000 μm. The method is a laser diffraction method, where a laser beam is directed at the sample travelling in a flow-through cuvette.

The polymer sample was first pre-treated by screening out particles larger than 2 mm. The screened sample was mixed with isopropanol and put in an ultrasound device in order to separate the particles from each other. The pre-treated sample was then placed in the sample unit and analysed. The result was calculated using a computer program provided with the instrument.

The PSD index is defined by the following equation (3) below:

$$PSD \text{ Index} = \frac{d_{90} - d_{10}}{d_{50}} \quad (3)$$

wherein $d_{50}$ represents the median or mean particle diameter, $d_{90}$ represents the smallest particle diameter so that 90% of the particles have a smaller diameter than $d_9$, $d_{10}$ represents the smallest particle diameter so that 10% of the particles have a smaller diameter than $d_{10}$.

$d_{50}$, $d_{10}$ and $d_{90}$ are calculated from the particle size distribution in terms of mass percentage as determined by laser diffraction (Coulter) technique according to ISO 13320-1 described above.

EXAMPLES

In the following, the invention will be further described by way of examples and the corresponding FIGURE.

FIG. 1 shows a loop reactor-hydrocyclone configuration according an embodiment of the present invention.

The reference signs are as follows:
(1) loop reactor
(2) main feed stream
(3) slurry stream
(4) outlet stream
(5) concentrator
(6) overflow stream
(7) second feed stream
(8) concentrator inlet stream
(9) first feed stream
(10) third feed steam
(11) product withdrawal stream
(12) bottom outlet stream
Catalyst Preparation
Complex Preparation:

87 kg of toluene was added into the reactor. Then 45.5 kg Bomag A (Butyloctyl magnesium) in heptane was also added in the reactor. 161 kg 99.8% 2-ethyl-1-hexanol was then introduced into the reactor at a flow rate of 24-40 kg/h. The molar ratio between BOMAG-A and 2-ethyl-1-hexanol was 1:1.83.

Solid Catalyst Component Preparation:

330 kg silica (calcined silica, Sylopol® 2100) and pentane (0.12 kg/kg carrier) were charged into a catalyst preparation reactor. Then EADC (Ethylaluminium dichloride) (2.66 mol/kg silica) was added into the reactor at a temperature below 40° C. during two hours and mixing was continued for one hour. The temperature during mixing was 40-50° C. Then Mg complex prepared as described above was added (2.56 mol Mg/kg silica) at 50° C. during two hours and mixing was continued at 40-50° C. for one hour. 0.84 kg pentane/kg silica was added into the reactor and the slurry was stirred for 4 hours at the temperature of 40-50° C. Finally, TiCl$_4$ (1.47 mol/kg silica) was added during at least 1 hour at 55° C. to the reactor. The slurry was stirred at 50-60° C. for five hours. The catalyst was then dried by purging with nitrogen.

Molar composition of the ready catalyst is: Al/Mg/Ti=1.5/1.4/0.8 (mol/kg silica).

Inventive Example 1 (IE1)

A loop reactor (1) as depicted in FIG. 1 having a volume of 33 m³ was operated at a temperature of 95° C. and a pressure of 60 bars. Into the loop reactor (1) the catalyst as described above was introduced into the loop reactor (1) at a rate of 2.5 kg/h via main feed stream (2). 5400 kg/h propane, 3000 kg/h ethylene and hydrogen were introduced into the loop reactor (1) via the main feed stream (2) so that the molar ratio of hydrogen to ethylene in the main feed stream (2) was 400 mol/kmol. Slurry stream (3) was withdrawn from the loop reactor (1) at a flow rate of 8493 kg/h having a solids concentration of 35 wt %. The outlet stream (4) coming from the loop reactor (1) with a flow rate of 75000 kg/h was combined with a first feed stream (9) having a flowrate of ethylene of 1667 kg/h and a molar ratio of hydrogen to ethylene of 400 mol/kmol. The outlet stream (4) and the first feed stream (9) form a concentrator inlet stream (8) which enters the hydrocyclone (5) acting as concentrator. The overflow stream (6) from the hydrocyclone (5) was withdrawn at a flow rate of 27600 kg/h and was combined with a second feed stream (7) having an ethylene flowrate of 1667 kg/h and a molar ratio of hydrogen to ethylene of 400 mol/kmol, and was returned to the loop reactor (1) at a distance of ½ of the total reactor length downstream from the inlet of main feed stream (2). The bottom outlet stream (12) of the hydrocyclone (5) was withdrawn at a rate of 44160 kg/hr. The bottom outlet stream (12) was combined with a third feed stream (10) having an ethylene flowrate of 1667 kg/h and a molar ratio of hydrogen to ethylene of 400 mol/kmol, and was directed to a reactor point at a distance of ¾ of the total reactor length downstream from the inlet of the main feed stream (2). Meanwhile, the product withdrawal stream (11) with a flow rate and solid concentration of 4907 kg/hr and 52.3 wt %, respectively, was combined with slurry stream (3) and directed towards the downstream units.

With this configuration of the loop reactor (1), the hydrocyclone efficiency was about 95.6% while hydrogen to ethylene molar ratio was kept within acceptable limits with maximum change within one loop cycle of 25 mol/kmol. The use of the hydrocyclone under the configuration improves also the stability of the loop reactor while reaching high solid polyolefin particle separation efficiency values, enriching, thus, the loop reactor outlet stream with solids. Moreover, the uniform reactants' concentrations is the key in producing polyolefin particles with homogenised molecular properties (e.g., molecular weight distribution), uniform particle growth rate and narrow particle size distribution (PSD), enhancing, thus, the particle homogeneity in the loop reactor. The PSD index with the above configuration was 1.3. All operating data and results for Example 1 are provided in Table 1.

Comparative Example 1 (CE1)

The procedure of Example 1 was repeated except that first feed stream (9) was not added to the outlet stream (4). In addition, the flowrate of the main feed stream (2) was modified to 4670 kg/h ethylene to keep total ethylene feed rate to the loop reactor (1) equal to that in Example 1. Besides, hydrogen to ethylene molar ratio was kept at 400 mol/kmol. In this configuration, the hydrocyclone separation efficiency decreased to a value around 89% as given in Table 1.

All operating data and results for Comparative Example 1 are provided in Table 1.

Comparative Example 2 (CE2)

The procedure of Example 1 was repeated without utilizing the hydrocyclone (5). In this case, ethylene and hydrogen were introduced via main feed stream (2) into the loop reactor (1). More specific, into the loop reactor (1) were introduced 5400 kg/h of propane, 8000 kg/h of ethylene and hydrogen via the main feed stream (2) so that the molar ratio of hydrogen to ethylene was 400 mol/kmol. In this configuration, the hydrogen to ethylene molar ratio showed a maximum change within one cycle of 50 mol/kmol. The lack of uniformity of reactants' concentrations in that case led to less uniform particle growth rate and broader particle size distribution, with PSD index of 2.5. Without using a hydrocyclone the particle homogeneity was deteriorated within the loop reactor (1).

All operating data and results for Comparative Example 2 are provided in Table 1.

TABLE 1

Operating data of the examples and results

| | Example | | |
|---|---|---|---|
| | IE1 | CE1 | CE2 |
| Reactor temperature, ° C. | 95 | 95 | 95 |
| Reactor pressure, bar | 60 | 60 | 60 |
| Propane flowrate in main feed stream (2), kg/h | 5400 | 5400 | 5400 |
| Ethylene flowrate in main feed stream (2), kg/h | 3000 | 4667 | 8000 |
| Hydrogen to ethylene molar ratio in main feed stream (2), mol/kmol | 400 | 400 | 400 |
| Slurry stream (3) flowrate, kg/h | 8493 | 8900 | 13400 |
| Outlet stream (4) flowrate from reactor (1) to hydrocyclone (5), kg/h | 75000 | 75000 | n.a. |
| Solids concentration in stream (3), % wt | 35 | 35 | 35 |
| Hydrocyclone overflow stream (6) rate, kg/h | 27600 | 30000 | n.a. |
| Ethylene flow rate in second feed stream (7), kg/h | 1667 | 1667 | n.a. |
| Hydrogen to ethylene molar ratio in second feed stream (7), mol/kmol | 400 | 400 | n.a. |
| Ethylene flow rate in first feed stream (9), kg/h | 1667 | n.a. | n.a. |
| Hydrogen to ethylene molar ratio in first feed stream (9), mol/kmol | 400 | n.a. | n.a. |
| Ethylene flow rate in third feed stream (10), kg/h | 1667 | 1667 | n.a. |
| Hydrogen to ethylene molar ratio in third feed stream (10), mol/kmol | 400 | 400 | n.a. |
| Product withdrawal stream (11), kg/h | 4907 | 4500 | n.a. |
| Hydrocyclone bottom outlet stream (12) rate, kg/h | 44160 | 40500 | n.a. |
| Bottom outlet stream (12) solid concentration, wt % | 52.3 | 52.3 | n.a. |
| Maximum change of hydrogen to ethylene molar ratio within one loop cycle, mol/kmol | 20 | 28 | 50 |
| PSD index | 1.3 | 1.6 | 2.5 |
| Separation efficiency, % | 95.6 | 89.7 | n.a. | n.a. = not available/not applicable

The invention claimed is:

1. A process for polymerising alpha-olefin monomers in a loop reactor comprising the steps of:
   (i) introducing a main feed stream (2) comprising at least one alpha-olefin monomer into the loop reactor (1);
   (ii) introducing a polymerisation catalyst into the loop reactor (1);
   (iii) polymerising the at least one alpha-olefin monomer in the presence of the polymerisation catalyst in the loop reactor (1) to produce a slurry comprising polyolefin particles;
   (iv) withdrawing an outlet stream (4) comprising at least a portion of the slurry from the loop reactor (1);
   (v) adding a first feed stream (9) comprising the at least one alpha-olefin monomer and/or hydrogen to the outlet stream (4) to form a concentrator inlet stream (8);
   (vi) introducing the concentrator inlet stream (8) into a concentrator (5);
   (vii) withdrawing from the concentrator (5) an overflow stream (6) comprising the polyolefin particles, wherein the concentration of the polyolefin particles in the overflow stream (6) is smaller than in the concentrator inlet stream (8);
   (viii) withdrawing from the concentrator (5) a bottom outlet stream (12) comprising the polyolefin particles, wherein the concentration of the polyolefin particles in the bottom outlet stream (12) is greater than in the concentrator inlet stream (8);
   (ix) returning the overflow stream (6) into the loop reactor (1) in an area different from that from which the outlet stream (4) is withdrawn.

2. The process according to claim 1, wherein the bottom outlet stream (12) is returned into the loop reactor (1) in an area different from that from which the outlet stream (4) is withdrawn or passed to a subsequent loop reactor or passed to a subsequent gas phase reactor.

3. The process according to claim 1, further comprising adding a second feed stream (7) comprising the at least one alpha-olefin monomer and/or hydrogen to the overflow stream (6) before returning the combined second feed stream/overflow stream into the loop reactor (1).

4. The process according to claim 2, further comprising adding a third feed stream (10) comprising the at least one alpha-olefin monomer and/or hydrogen to the bottom outlet stream (12) before returning the combined third feed stream/bottom outlet stream into the loop reactor (1).

5. The process according to claim 1, further comprising the step of withdrawing a slurry stream (3) from the loop reactor (1).

6. The process according to claim 1, wherein a product withdrawal stream (11) is split off from the bottom outlet stream (12).

7. The process according to claim 6, wherein the slurry stream (3) is combined with the product withdrawal stream (11) to form a combined loop reactor product stream.

8. The process according to claim 1, wherein the overflow stream (6) enters the loop reactor (1) at a distance of 30 to 60% of the total loop reactor length downstream of the inlet of the main feed stream (2).

9. The process according to claim 2, wherein the bottom outlet stream (12) enters the loop reactor (1) at a distance of 65 to 90% of the total loop reactor length downstream of the inlet of the main feed stream (2).

10. The process according to claim 1, wherein the at least one alpha-olefin monomer is ethylene or propylene.

11. The process according to claim 1, wherein the molar ratio of hydrogen to alpha-olefin monomer in the first feed stream (9) is 0 to 10000 mol/kmol.

12. The process according to claim 1, wherein a prepolymerization step or a polymerization step precedes step (i).

13. The process according to claim 1, wherein the polymerization catalyst is a Ziegler-Natta catalyst or a metallocene catalyst.

14. A loop reactor for the process according to claim 1, comprising
   a concentrator (5),
   a first conveying pipe connecting a first area of the loop reactor (1) with a middle section of the concentrator (5) to withdraw an outlet stream (4) from the loop reactor (1) and to introduce a concentrator inlet stream (8) into the concentrator (5),
   a second conveying pipe connecting an upper section of the concentrator (5) with a second area of the loop reactor (1) to withdraw an overflow stream (6) from the concentrator (5) and to introduce said overflow stream (6) into the loop reactor (1),
   a first feed pipe connected to the first conveying pipe for introducing a first feed stream (9) into the first conveying pipe to form a concentrator inlet stream (8), and a third conveying pipe connecting a lower section of the concentrator (5) with a third area of the loop reactor.

15. A process for polymerising alpha-olefin monomers in a loop reactor comprising the steps of:
(i) introducing a main feed stream (2) comprising at least one alpha-olefin monomer into the loop reactor (1);
(ii) introducing a polymerisation catalyst into the loop reactor (1);
(iii) polymerising the at least one alpha-olefin monomer in the presence of the polymerisation catalyst in the loop reactor (1) to produce a slurry comprising polyolefin particles;
(iv) withdrawing an outlet stream (4) comprising at least a portion of the slurry from the loop reactor (1);
(v) adding a first feed stream (9) comprising the at least one alpha-olefin monomer and/or hydrogen to the outlet stream (4) to form a concentrator inlet stream (8);
(vi) introducing the concentrator inlet stream (8) into a concentrator (5);
(vii) withdrawing from the concentrator (5) an overflow stream (6) comprising the polyolefin particles, wherein the concentration of the polyolefin particles in the overflow stream (6) is smaller than in the concentrator inlet stream (8);
(viii) withdrawing from the concentrator (5) a bottom outlet stream (12) comprising the polyolefin particles, wherein the concentration of the polyolefin particles in the bottom outlet stream (12) is greater than in the concentrator inlet stream (8);
(ix) returning the overflow stream (6) into the loop reactor (1) in an area different from that from which the outlet stream (4) is withdrawn;
wherein the loop reactor comprises:
the concentrator (5),
a first conveying pipe connecting a first area of the loop reactor (1) with a middle section of the concentrator (5) to withdraw the outlet stream (4) from the loop reactor (1) and to introduce the concentrator inlet stream (8) into the concentrator (5),
a second conveying pipe connecting an upper section of the concentrator (5) with a second area of the loop reactor (1) to withdraw the overflow stream (6) from the concentrator (5) and to introduce the overflow stream (6) into the loop reactor (1),
a first feed pipe connected to the first conveying pipe for introducing the first feed stream (9) into the first conveying pipe to form a concentrator inlet stream (8),
and a third conveying pipe connecting a lower section of the concentrator (5) with a third area of the loop reactor.

16. The process of claim 1, wherein the loop reactor is connected in series with at least one additional reactor.

17. The process of claim 16, wherein the at least one additional reactor comprises a slurry reactor.

18. The process of claim 16, wherein the at least one additional reactor comprises a gas phase reactor.

19. The process of claim 16, wherein the at least one additional reactor comprises a gas phase reactor downstream of the loop reactor.

20. The process of claim 19, wherein the at least one additional reactor further comprises a slurry reactor upstream of the loop reactor.

* * * * *